United States Patent
Giesler et al.

(10) Patent No.: US 11,872,639 B2
(45) Date of Patent: Jan. 16, 2024

(54) POSITIONING DEVICE

(71) Applicant: SAUTER FEINMECHANIK GMBH, Metzingen (DE)

(72) Inventors: Steffen Giesler, Albstadt (DE); Marius Ewald, Pfullingen (DE)

(73) Assignee: KOLIBRI BETEILIGUNGSGESELLSCHAFT MBH & CO. KGAA, Kleinmachnow (DE)

( * ) Notice: Subject to any disclaimer, the term of this patent is extended or adjusted under 35 U.S.C. 154(b) by 372 days.

(21) Appl. No.: 17/291,729

(22) PCT Filed: Jan. 7, 2020

(86) PCT No.: PCT/EP2020/050216
§ 371 (c)(1),
(2) Date: May 6, 2021

(87) PCT Pub. No.: WO2020/148114
PCT Pub. Date: Jul. 23, 2020

(65) Prior Publication Data
US 2022/0009005 A1    Jan. 13, 2022

(30) Foreign Application Priority Data
Jan. 19, 2019 (DE) .................... 10 2019 000 383.7

(51) Int. Cl.
B23B 29/20 (2006.01)
B23B 29/24 (2006.01)
B23Q 3/18 (2006.01)

(52) U.S. Cl.
CPC ............ B23B 29/20 (2013.01); B23B 29/242 (2013.01); B23Q 3/186 (2013.01);
(Continued)

(58) Field of Classification Search
CPC ... B23B 29/244; B23B 29/246; B23B 29/248; B23B 29/242; B23B 29/24; B23B 29/34;
(Continued)

(56) References Cited

U.S. PATENT DOCUMENTS 2,531,198 A * 11/1950 Bruet .................... B23Q 16/10
188/69
8,006,593 B2 * 8/2011 Sahm .................... B23B 29/242
82/158

(Continued)

FOREIGN PATENT DOCUMENTS

DE    10 2005 033 890         1/2007
DE    102008048206 A1 * 4/2010 ............. B23B 29/20
(Continued)

OTHER PUBLICATIONS

International Search Report (ISR) dated April 23, 2020 in International (PCT) Application No. PCT/EP2020/050216.

*Primary Examiner* — Erica E Cadugan
(74) *Attorney, Agent, or Firm* — WENDEROTH, LIND & PONACK, L.L.P.

(57) ABSTRACT

A positioning device positions a tool holder (12, 14, 16, 18) on a tool turret (6) of a machine tool by positioning pins (10). The positioning pins are secured to the tool turret (6) and engage with receptacles (40) on the tool holder (6) when the tool holder (12, 14, 16, 18) is attached to the tool turret (6). At least one of the receptacles of the tool holder (6) is formed by a sleeve (40), with which the assignable positioning pin (10) engages in the mounted state while contacting the inner circumferential surface (58) of the sleeve (40). The inner circumferential surface (58) is part of an expanding part (56), which, when the pin (10) engages, expands elastically and flexibly away from the pin (10).

11 Claims, 5 Drawing Sheets

(52) U.S. Cl.
CPC ..... *B23B 2260/016* (2013.01); *B23B 2265/08* (2013.01); *Y10T 29/5155* (2015.01)

(58) Field of Classification Search
CPC ..... Y10T 29/39; Y10T 82/159; Y10T 408/35; Y10T 29/5154; Y10T 29/5155; Y10T 29/5167; Y10T 29/519; Y10T 82/12; Y10T 82/121; Y10T 82/2587; Y10T 82/2506; Y10T 82/2508; Y10T 408/37
USPC ........ 29/40, 33 J, 35.5, 48.5 A; 82/159, 121; 408/35
See application file for complete search history.

(56) References Cited

U.S. PATENT DOCUMENTS

| | | |
|---|---|---|
| 2008/0282861 A1 | 11/2008 | Miyairi et al. |
| 2010/0251862 A1 | 10/2010 | Ueda et al. |
| 2011/0023276 A1 | 2/2011 | Jansen |
| 2013/0043634 A1 | 2/2013 | Kitaura et al. |

FOREIGN PATENT DOCUMENTS

| | | | |
|---|---|---|---|
| DE | 10 2010 003 397 | 10/2010 | |
| DE | 10 2009 037 167 | 2/2011 | |
| DE | 10 2010 022 435 | 12/2011 | |
| DE | 10 2014 003 336 | 9/2015 | |
| DE | 102015012938 A1 * | 4/2017 | |
| DE | 102016009895 A1 * | 2/2018 | ......... B23B 31/1078 |
| DE | 10 2018 004 677 | 12/2019 | |
| EP | 1 992 435 | 11/2008 | |
| EP | 3682990 A1 * | 7/2020 | |

* cited by examiner

Coupling of the Tool Turret

Fig. 9

POSITIONING DEVICE

FIELD OF THE INVENTION

The invention relates to a positioning device for positioning a tool holder on a tool turret of a machine tool by positioning pins, which are secured to the tool turret and which engage with receptacles on the tool holder when the tool holder is attached to the tool turret.

BACKGROUND OF THE INVENTION

Tool turrets having a swiveling tool disk with a plurality of work stations on the outer circumference of the tool disk, to which tool holders for machining tools can be secured in a precisely fitting position, are state of the art in various designs, cf. for instance DE 10 2005 033 890 A1 or DE 10 2014 003 336 A1. Such tool turrets usually have a base body, which can be connected to the corresponding machine tool and on which the tool disk is mounted rotatably about the turret axis. The work stations equipped with tool holders can be pivoted into a working position by rotating the tool disk. The machining tools to be used with the tool holders are mainly tools for metal cutting, such as rotatory driven drilling or turning tools, or static tools, such as lathe tools. For certain manufacturing tasks, such as workpieces for the production of small series, the machining tools have to be changed frequently, resulting in a considerable amount of work for the operating personnel. To reduce the resulting high machining costs, efforts are made to provide mechanical support for the process of changing the tool. A post-published state of the art to this effect is disclosed in patent application DE 10 2018 004 677.0. In the tool turret shown there, the fixing devices, which are usually provided in such tool turrets for attaching the tool holders to the work stations and releasing them therefrom, can be actuated under machine control. In this way, in automatic operation the change process can be performed by a handling robot, which removes the released tool holder and inserts another tool holder in the work station. When the tool change is performed fully automatically, an at least partially automated operation of the entire concerning machining system is feasible as well, which provides for a reduction in set-up costs and results in a corresponding reduction of man hours and labor costs.

To warrant high-precision machining when using the tool turrets, it is imperative that the positioning device provides an absolutely accurate position of the tool holders used at the work station concerned. This results in high demands on the accuracy of the geometry of the positioning pins and the receptacles provided on the tool holder for the engagement of the positioning pins. When the machine is used to change tools, this in turn implies that the gripper on a robot arm must comply with the tightest tolerances in controlling the position of the gripper during the insertion process. To ensure a safe insertion of the gripped tool holder, high demands must therefore be made on both the mechanics and the control of the handling robot concerned.

SUMMARY OF THE INVENTION

With regard to this issue, the invention addresses the problem of providing a positioning device, which guarantees a highly precise positioning of the tool holder concerned and which is particularly suitable for machine-based positioning in the course of tool change operations.

According to the invention, this problem is solved by a positioning device having at least one of the receptacles of the tool holder formed by a sleeve, with which the assignable positioning pin engages in the mounted state while contacting the inner circumferential surface of the sleeve. The inner circumferential surface is part of an expanding part which, when the pin engages, expands elastically and flexibly away from the pin. When the gripper of the concerning handling system moves the tool holder to the concerning work station, the respective positioning pin therefore engages with an elastically yielding sleeve part via a contact point, to provide compensation for positional tolerances of the attachment position of the tool holder. Due to the resulting reduced requirements for small positional tolerances of the gripper and correspondingly reduced demands on the mechanics and control of a handling system, the positioning device according to the invention is therefore advantageously suited for machine tool change processes to be performed reliably and at low cost.

In advantageous exemplary embodiments, the pin, to the extent that it protrudes from the turret, has an outer circumferential surface, which is at least partially different from the inner circumferential surface of the sleeve in such a way that in the mounted state only partial contact, preferably in the manner of a line contact, is established between the surfaces. Avoiding full-surface contact together with the corresponding reduction in the effective friction surface result in a more favorable ratio between axial pull-in force and the transverse force, acting as alignment force, during the insertion process.

The arrangement can be advantageously made such that the outer circumferential surface of the pin is at least partially convex or conical and the inner circumferential surface of the sleeve is conical or concave at least in the area of contact. With particular advantage, the combination of a spherically ground positioning pin and a sleeve having an inner cone can be provided in this respect.

In preferred exemplary embodiments, in the installed state the inner circumference of the sleeve expands conically towards the surroundings. The expanding part of the sleeve is encompassed on the outer circumference by a recess in the holder through which the sleeve passes while maintaining a radial gap. The expanding part of the sleeve then forms a kind of entry funnel for engaging with the pin. The wall of the entry funnel can be expanded due to the radial gap to the encompassing wall of the tool holder.

In advantageous exemplary embodiments, both the pin and the sleeve are fixed in the turret or in the holder by one screw connection each, have a continuous hollow duct, in which a point of action for an operating tool is located, and rest against the turret or the holder via an annular support part outside the screw connection. Securing by screwing, in conjunction with the point of action, formed in the hollow duct, advantageously having the shape of a hexagon socket, permits secure fixing based on a simple assembly process. Simultaneously, the screw-in depth of the pin and/or sleeve can be specified via the positional relationship between the support part and the turret or holder in the screwed-in state.

Advantageously, the arrangement can be made in such a way that the holder, having a rectangular cross-section, has at each of its corner areas one sleeve, to which four pins are assigned on the turret at a preferably standardized interface. The holder and the pins provide a reach-through for the passage of a drive shaft of a drivable machining tool, which can be secured at the turret by the holder. The arrangement of mating points distributed in this way ensures high-precision alignment in both the direction of the turret axis and transversely to the holder. At the same time the interaction, according to the invention, between the respective pin and the expandable expanding part of the sleeve eliminates the problems normally occurring for several mating points because of static overdetermination.

The arrangement can be advantageous in that the holder remains still on the turret by a detachable fixing device, even if a coupling device in the turret has released the holder for a tool change operation. This detachable fixing device provides the advantageous option of safely transferring a tool holder to be changed to a desired change position by turning the tool disk without the released tool holder falling off the tool disk in the process, if a tool change processes is performed automatically or semi-automatically. A tool holder to be exchanged is released by system control in a work station, as shown in the German patent application DE 10 2018 004 677.0, which discloses a post-published state of the art.

In advantageous exemplary embodiments, this fixing device for a holder has at least one bending rod. One free fixing end of the bending rod is secured to the holder and, in the mounted state, the other free latching end of the bending rod extends under a projection in the hollow duct of the pin. The latching end of the bending rod, which passes through both cavities and is actuated by an actuating device, comes out of engagement with the projection of the pin and the holder, is released from the turret and can be removed.

Advantageously, the arrangement may in this case be such that the actuating device has an actuating pin, which is supported in the holder transversely displaceable to the bending rod. One end of the actuating pin acts on the bending rod. From the other end, which is accessible from the outside of the holder, the actuating pin can be set into a shift motion, which brings the latching end of the bending rod into the releasing position. The accessibility of the actuation from the outside permits, in the case of change operations to be performed mechanically by a handling system, the actuation of the fixing device by the gripper on the robot arm. The robot arm, when gripping the released tool holder, acts on the actuating pin and moves it into the unlocking position.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
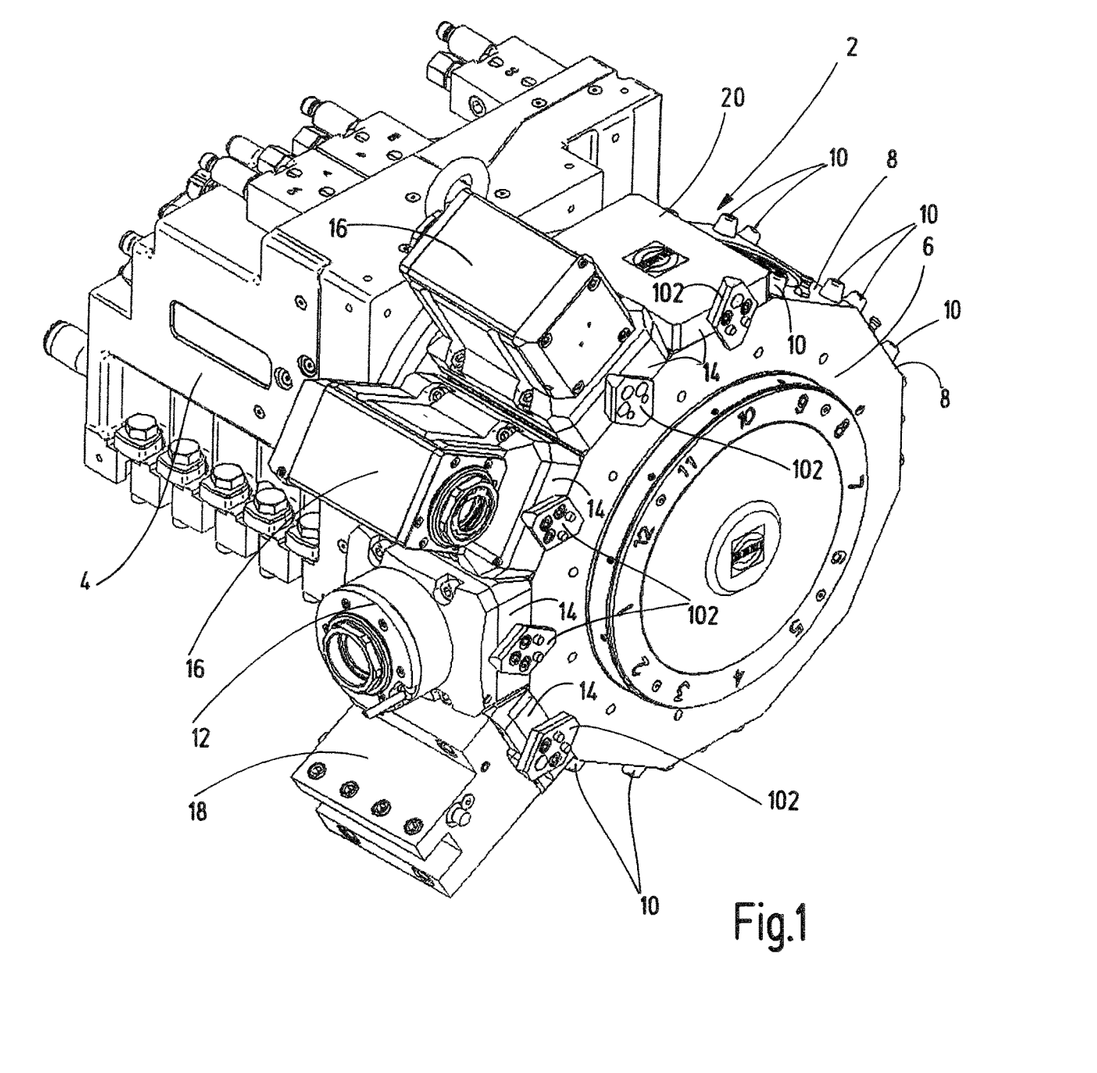
FIG. 1 is a perspective view of a tool turret equipped with a positioning device according to a first exemplary embodiment of the invention, viewed towards the tool disk.
Figure 2:
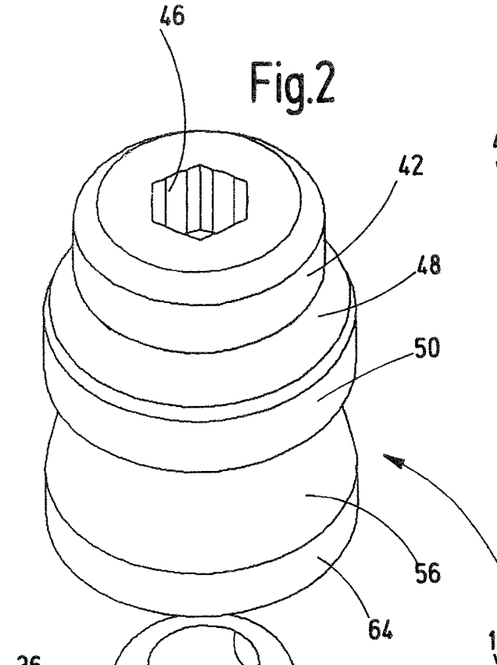
FIG. 2 is an enlarged perspective view of a sleeve of the first exemplary embodiment, viewed on the top.
Figure 3:
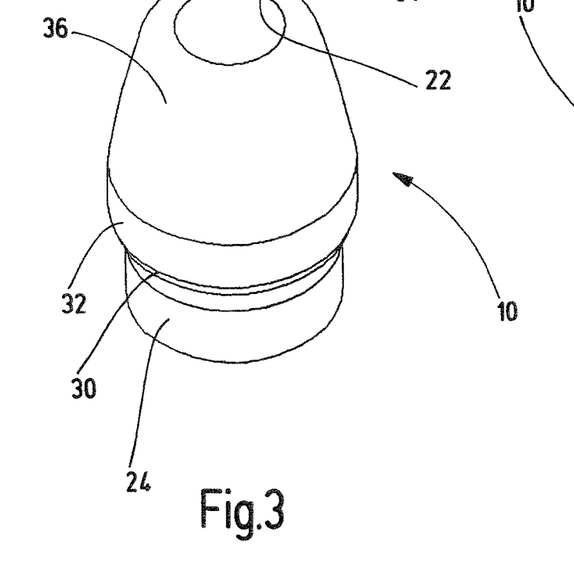
FIG. 3 is a perspective view of a positioning pin of the first exemplary embodiment, drawn at the scale of FIG. 2 and viewed from the top.
Figure 4:
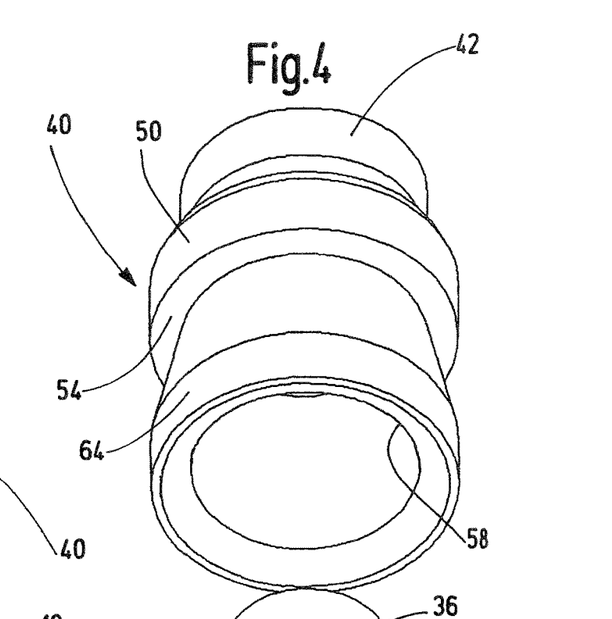
FIG. 4 is a perspective view of the sleeve of FIG. 2, drawn to the same scale and viewed from below.
Figure 5:
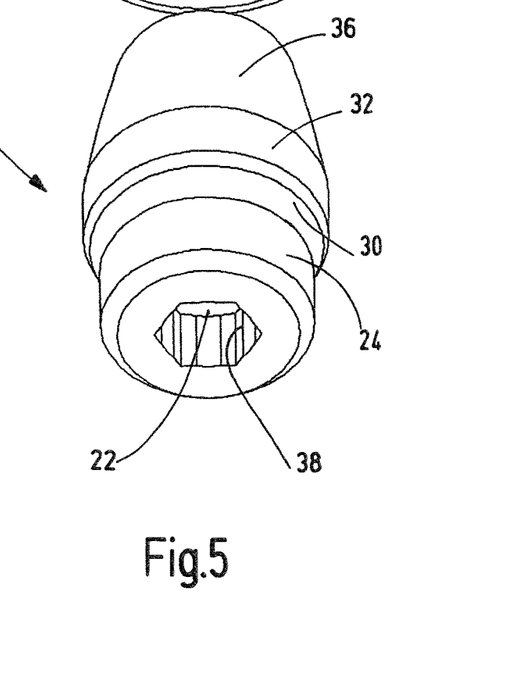
FIG. 5 is a perspective view of the positioning pin of FIG. 3, drawn to the same scale and viewed from below.

The tool turret 2 shown in FIG. 1 has, on a base body 4, a tool disk 6 supported pivotably about a turret axis. The tool disk, in the manner customary for such turrets, has on its outer circumference work stations, in the example shown in FIG. 1 12 work stations. For fixing tool holders, a mounting surface 8 (only partially numbered in FIG. 1) is formed at every work station. At mounting surfaces 8, tool holders via an assigned foot part 14 can be fixed in an aligned position by positioning pins 10. In the illustration of FIG. 1 only part of the work stations is equipped with tool holders. Apart from a tool holder 12, which is designed for a driven tool having straight drive axis, FIG. 1 shows tool holders 16 for driven tools having an angle drive, a tool holder 18 for a static tool, such as a lathe tool, and a cover 20, which is formed by a foot part 14 without the assigned tool holder part. As a protective element at an empty work station, the cover 20 can, in a positional orientation predetermined by the positioning device according to the invention, be attached to or released from the concerning mounting surface 8 of the tool turret in the same way as the foot parts 14 of the tool holders 12, 16, 18. The fixing device can be actuated by the tool drive of the tool disk 6 in a system-controlled manner, as shown in the patent application DE 10 2018 004 677.0, which discloses a post-published state of the art.

Figure 6:
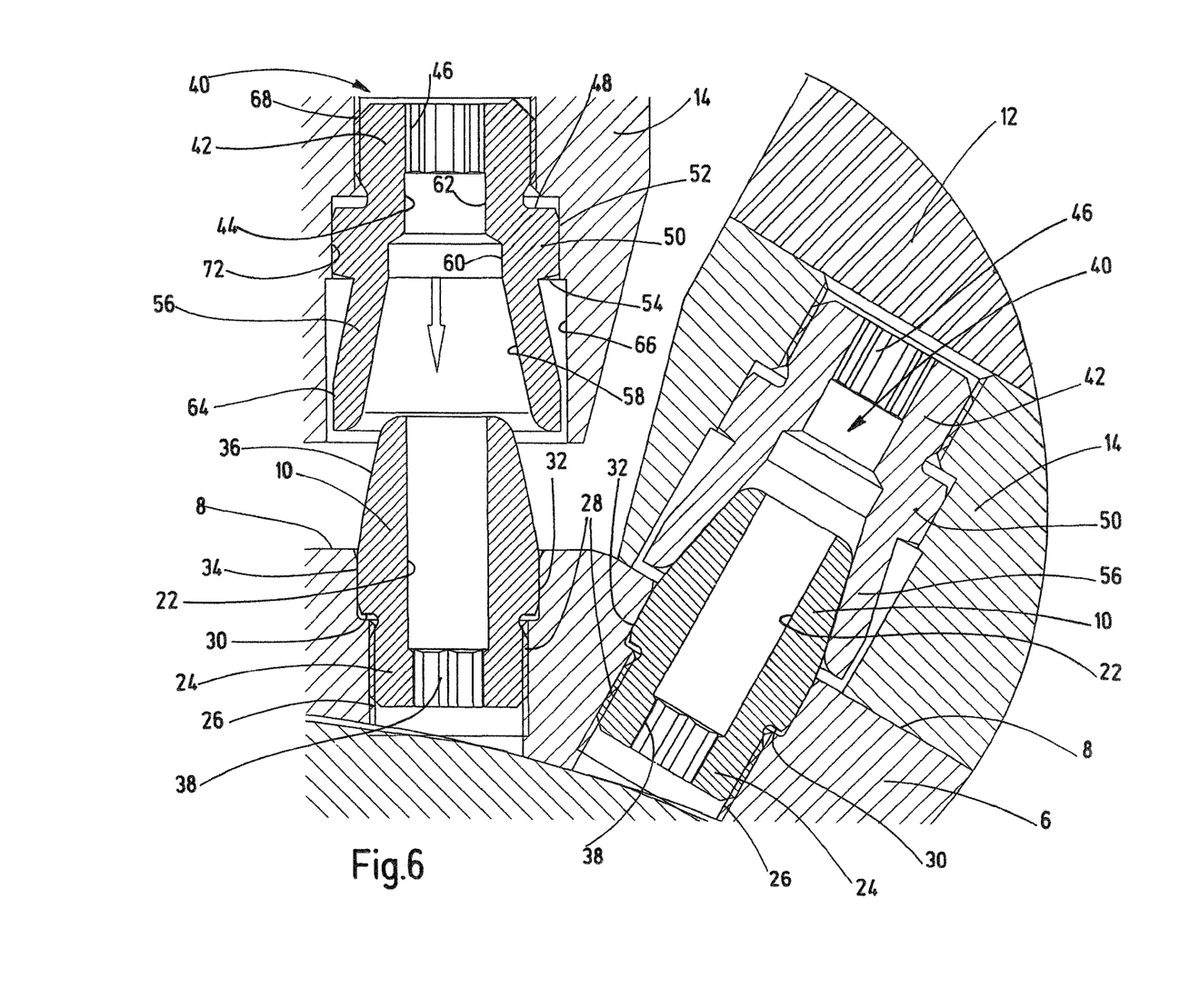
FIG. 6 is a partial plan view in section in a radial plane, of a circumferential section of the tool disk of FIG. 1 according to the first exemplary embodiment, wherein of two adjacent working stations with one positioning pin each of the first exemplary embodiment of the positioning device is shown, and wherein on the left side an assigned subsection of a tool holder prior to attachment is shown and on the right side an assigned subsection of a tool holder in the inserted position is shown.

The positioning pins 10 are one-piece rotational bodies, each having an interior, coaxially continuous hollow duct 22. At their mounting ends, the positioning pins 10 each have a threaded section 24, which can be used to screw them into a female thread 26 in a drilled receiving hole 28 in the mounting surface 8 of the assigned work station of the tool disk 6. At the end of the threaded section 24, the length of which is approximately one third of the total length of the positioning pin 10, the outer diameter of the threaded pin 10 merges at a step 30 into a circular cylindrical part 32 having an enlarged diameter, for which in the drilled receiving hole 28 between the female thread 26 and the end of the drilled hole a drilled hole section 34 forms a snug fit. In the screwed-in position, the step 30 contacts the shoulder formed between the cylindrical part 32 and the female thread 26 (FIG. 6). The positioning pin 10 protrudes by approximately half of its total length beyond the mounting surface 8. The part, protruding from the mounting surface 8, of the positioning pin 10 is ground crowned and has a slightly convexly curved shape on its outer circumferential surface 36. The positioning pin 10 is completed by an internal hexagon socket 38, formed at the mounting end in the hollow duct 22 within the threaded section 24, as a point of action for a tool, which can be used to form the screw connection.

As an alignment part, assigned to the foot part 14 of the tool holders 12, 16, 18 or the cover 20, a sleeve 40 is provided which, like the positioning pins 10, is formed by a one-piece rotary body. As a screw-in part, sleeve has a male threaded section 42 starting from the end of the sleeve 40, extending along approximately one quarter of the total length of the sleeve 40 and being able to be screwed together with a female thread 68 in a drilled receiving hole 66 of the respective foot part 14. Like the positioning pins 10, the sleeve 40 has an inner, continuous, coaxial hollow duct 44, see FIG. 6. In the end part, located within the threaded section 42, the hollow duct 44 has a hexagon socket 46 for an actuating tool, which can be applied to form the screw connection. At a shoulder 48, the outer diameter of the sleeve 40 is enlarged by a collar 50 having an outer circumference forming a mating surface 52. Adjoining to the collar 50 and offset radially inwards via a further shoulder 54, the sleeve has an expanding part 56 extending towards the end. The axial length of the expanding part 56 is slightly smaller than half of the total length of the sleeve 40. The wall thickness of the sleeve 40 in the area of its expanding part 56 is about half of the wall thickness of the collar 50, so that the expanding part 56 can be expanded by radial forces acting thereon. As can be seen most clearly from FIG. 6, in which not all elements are numbered in the part of the drawing on the right, the wall of the expanding part 56 starts from a point at the shoulder 54, which point is radially inwardly offset in relation to the collar 50. From that point, the wall of the expanding part 56 diverges towards the end. The inner peripheral surface 58 forms a cone expanding the hollow duct 44 like a funnel towards the end, through which the assigned fitting pin 10 can be inserted. Between the cone and the end provided with the hexagon socket 46, the inner diameter of the hollow duct 44 decreases in two stages having cylindrical drilled hole sections 60 and 62. On the outside, the expanding part 56 has a cylindrical outside end part 64 at the end of the outer cone. If the sleeve 40 is screwed into the foot part 14, as shown in FIG. 6, the end part 64 is located at a radial gap from the encompassing wall of the drilled receiving hole 66 formed in the foot part 14 for the sleeve 40.

Figure 7:
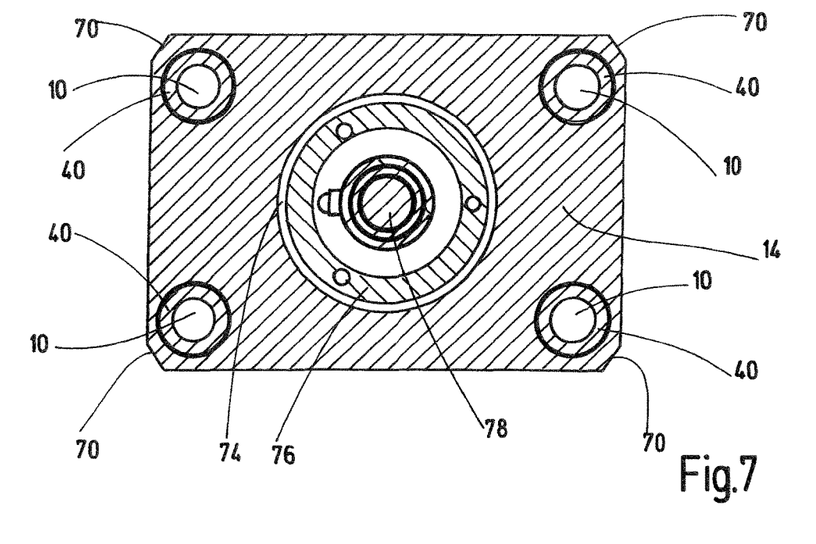
FIG. 7 is an end view in section of the foot part of a tool holder to be aligned by the positioning device according to the first exemplary embodiment of the invention.

FIG. 6 shows, in the part of the figure on the right, a subsection of a work station and the part of a tool holder 12, foot part 14 of which is placed on the mounting surface 8 and is aligned by the positioning device according to the invention. One of the positioning pins 10, assigned to the work station, is shown in the right partial representation of FIG. 6 in the positioning position retracted or received into the expanding part 56 of the assigned sleeve 40. The left part of FIG. 6 shows the position of the foot part 14 before it is attached to the tool disk 6 for the lifting out process using the assigned positioning pin 10. As shown, at the end of the circumferential surface 36, running crowned and having a convex curved shape, the outer diameter of the positioning pin 10 is smaller than the diameter of the opening of the expanding part 56, which widens with a conical inner circumferential surface 58. The entry funnel formed in this way therefore enables reliable entry of the positioning pin 10 into the expanding part 56 even in case of positional tolerances, because the surface contact only occurs within the expanding part 56. Possible positional tolerances are eliminated during the retraction process by the surface contact between the circumferential surface 36 of the pin 10 and the inner circumferential surface 58 of the expanding part 56, so that the precisely fitting alignment is achieved. Because the expanding part 56 can be elastically expanded and because the outer wall of the expanding part 56, starting from the starting point, radially inwardly offset at the shoulder 54, up to the end part 64, is at a radial gap from the encompassing wall of the drilled receiving hole 66, free space is available for deformation. Without impairing the accurate positioning, such a certain amount of flexibility avoids the problems known to occur in the presence of several mating points because of static overdetermination. It is therefore advantageous to provide at each of the work stations of the tool disk four positioning pins 10, which pins interact with sleeves 40, which sleeves are arranged in corner areas of the concerning rectangular foot part 14, as shown in FIG. 7. Due to the different shapes of the surfaces, interacting in the retracted or received position, in the example shown of the conical inner circumferential surface 58 of sleeve 40 and the convexly crowned circumferential surface 36 of pin 10, the contact surfaces in the insertion position are not in consistently full-surface to surface contact, but the contact is rather similar to a line contact.

FIG. 7 shows the arrangement of one sleeve 40 each in each of the four corner areas 70 of the foot part 14, rectangular in outline, of a concerning tool holder, which is intended for a rotary driven tool. For the passage of the assigned spindle drive, the foot part 14 has a centrally located passage opening 74 for the shank 76 and the shaft 78 of the concerning spindle drive.

Figure 8:
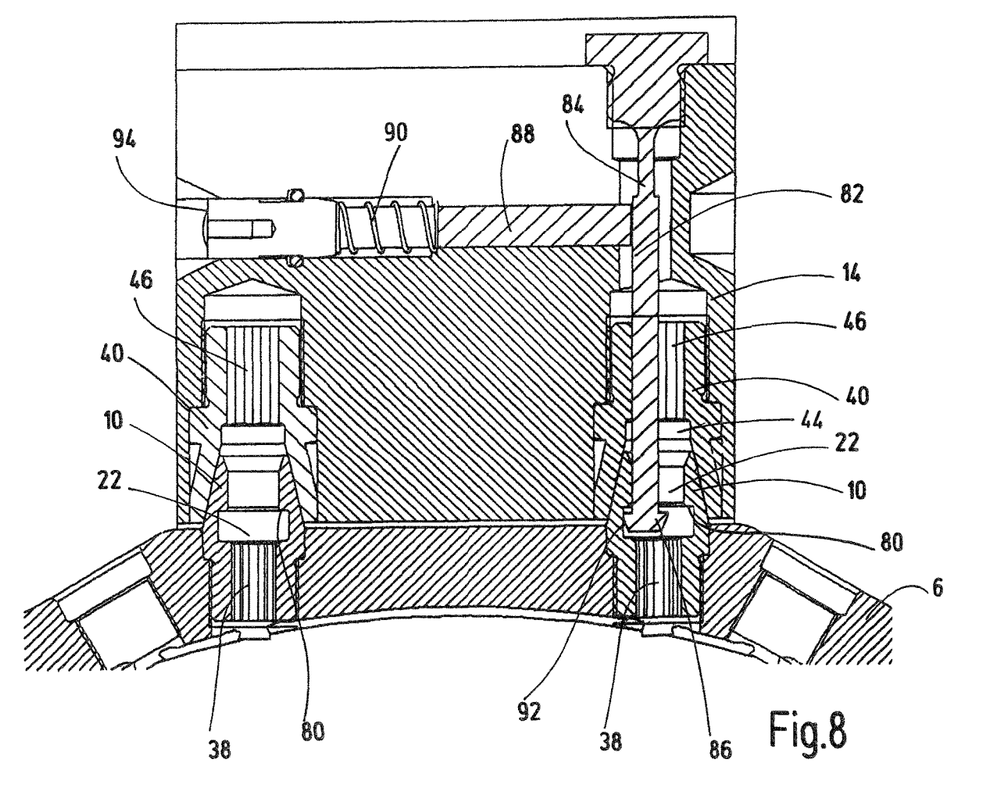
FIG. 8 is a partial end view in section in a radial plane of a circumferential section of the tool disk and a part of a tool holder aligned thereto by a positioning device according to a second exemplary embodiment of the invention, provided with a fixing device.
Figure 9:
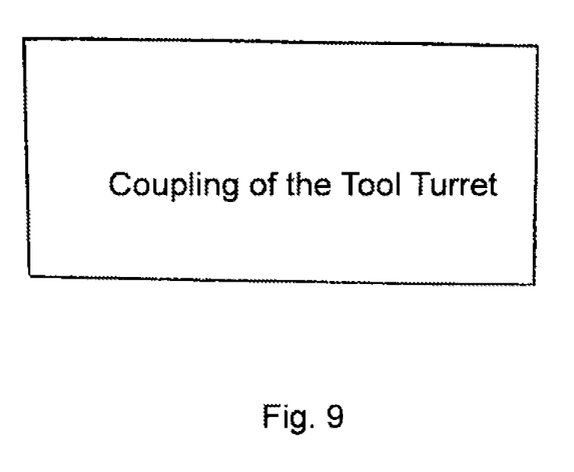
FIG. 9 is a schematic view of a further feature of the tool turret.

FIG. 8 shows a modified exemplary embodiment, in which the inner hollow duct 22 of the respective positioning pin 10 adjoining to the hexagon socket 38 does not form a smooth inner cylinder as in the first exemplary embodiment. Instead, the positioning pin 10 has a radially inwardly protruding latching projection 80. Latching projection 80 forms the component of an additional fixing device, securing a foot part 14 located on the tool disk 6 in the position aligned by f the positioning device, on the tool disk 6 even if the turret-sided fixing device has released this foot part 14. This securing fixing device comprises a bending rod 82, one end area of which is attached to the foot part 14 via a bending point 84 and extends starting from the bending point 84 through both cavities 44 and 22 of an interacting pair of sleeve 40 and positioning pin 10. At its free end 86 the bending rod 82 has a latching hook 92, which secures the foot part 14 to the tool disk 6 by latching engagement on the projection 80 of the pin 10. In order to release the latching engagement, in the foot part 14 an actuating pin 88 is provided, which is supported displaceable transversely to the bending rod 82 in the foot part 14 and can be displaced against the force of a return spring 90 in such a way that its free end applies bending force to the bending rod 82 near the bending point 84 and in that way disengages the latching hook 92 from the projection 80, releasing the foot part 14 for removal. The end 94, facing away from the bending rod 82, of the actuating pin 88 is accessible from the outside of the foot part 14, such that the additional fixing device can be unlocked by a control part acting on the actuating pin 88 from the outside.

While various embodiments have been chosen to illustrate the invention, it will be understood by those skilled in the art that various changes and modifications can be made therein without departing from the scope of the invention as defined in the claims.

The invention claimed is:
1. A positioning device, comprising:
   a tool turret of a machine tool;
   a tool holder on the tool turret;

a first positioning pin being secured to the tool turret and engaging a receptacle on the tool holder when the tool holder is attached to the tool turret, the receptacle on the tool holder having a first sleeve engaging the first positioning pin, when the tool holder is in a mounted state in which the tool holder is attached to the tool turret, while the first positioning pin is contacting an inner circumferential surface of the first sleeve, the inner circumferential surface being part of an expanding part that expands elastically and flexibly in a direction away from the first positioning pin when the expanding part is engaged by the first positioning pin, both the first positioning pin and the first sleeve being fixed in the tool turret and in the tool holder, respectively, by a respective screw, connection, both the first positioning pin and the first sleeve having a respective continuous hollow duct, a respective point of action for an operating tool being within each of the hollow ducts, and the first positioning pin resting against the tool turret via an annular support part that is outside of the corresponding screw connection, and the first sleeve resting against the tool holder via an annular support part that is outside of the corresponding screw connection; and a bending rod of a fixer, the bending rod releasably retaining the tool holder on the tool turret and extending through the hollow duct of the first sleeve and into the hollow duct of the first positioning pin.

2. The positioning device according to claim 1 wherein the first positioning pin comprises a portion thereof protruding from the tool turret, the portion of the first positioning pin having an outer circumferential surface at least partially different from the inner circumferential surface of the first sleeve such that in the mounted state only partial contact is established between the outer circumferential surface of the portion of the first positioning pin and the inner circumferential surface of the first sleeve.

3. The positioning device according to claim 2 wherein the partial contact is a line contact.

4. The positioning device according to claim 2 wherein the outer circumferential surface of the portion of the first positioning pin is at least partially convex or conical; and the inner circumferential surface of the first sleeve is conical or concave at least in the area of the partial contact.

5. The positioning device according to claim 1 wherein in an installed state of the first positioning pin in the first sleeve, an inner circumference of the first sleeve expands conically towards outer surroundings of the first sleeve, the expanding part of the first sleeve being encompassed on an outer circumference of the first sleeve by a recess in an inner surface in the tool holder through which recess the first sleeve passes while maintaining a gap between the first sleeve and the tool holder.

6. The positioning device according to claim 1 wherein the tool holder comprises a rectangular cross-section having first, second, third and fourth corner areas with the first sleeve, a second sleeve, a third sleeve and a fourth sleeve being at each of the first, second, third and fourth corner areas, respectively, and receiving the first positioning pin, a second positioning pin, a third positioning pin and a fourth positioning pin, respectively, which first positioning pin, second positioning pin, third positioning pin, and fourth positioning pin are on the tool turret; and the tool holder provides a passage for a drive shaft of a drivable machining tool, which drivable machining tool is secured at the tool turret by the tool holder.

7. The positioning device according to claim 1 wherein the tool holder remains connected to the tool turret by the fixer even if a coupling in the tool turret has released the tool holder for a tool change operation.

8. The positioning device according to claim 1 wherein one free fixing end of the bending rod is secured to the tool holder; and in the mounted state in which the tool holder is attached to the tool turret, a free latching end of the bending rod extends under a projection of the first positioning pin in the hollow duct of the first positioning pin, the latching end of the bending rod passing through the hollow duct of the first sleeve and being actuatable by an actuator and coming out of engagement with the projection of the first positioning pin to release the tool holder from the tool turret and to allow the tool holder to be removed from the tool turret.

9. The positioning device according to claim 8 wherein the actuator has an actuating pin being supported in the tool holder and being transversely displaceable relative to the bending rod, one end of the actuating pin acting on the bending rod, an opposite end of the actuating pin being accessible from outside of the tool holder, the actuating pin being movable to cause the latching end of the bending rod to come out of engagement with the projection of the first positioning pin.

10. A positioning device, comprising:
a tool turret of a machine tool;
a tool holder on the tool turret;
a first positioning pin being secured to the tool turret and engaging a receptacle on the tool holder when the tool holder is attached to the tool turret, the receptacle on the tool holder having a first sleeve engaging the first positioning pin, when the tool holder is in a mounted state in which the tool holder is attached to the tool turret while the first positioning pin is contacting an inner circumferential surface of the first sleeve, the inner circumferential surface being part of an expanding part that expands elastically and flexibly in a direction away from the first positioning pin when the expanding part is engaged by the first positioning pin, the first positioning pin and the first sleeve being fixed in the tool turret and in the tool holder, respectively, both the first positioning pin and the first sleeve having a respective continuous hollow duct;

a fixer detachably fixing the tool holder to the tool turret, one free fixing end of a bending rod of the fixer being secured to the tool holder; and in the mounted state in which the tool holder is attached to the tool turret, a free latching end of the bending rod extending under a projection of the first positioning pin in the hollow duct of the first positioning pin, the latching end of the bending rod passing through the hollow duct of the first sleeve and being actuatable by an actuator and coming out of engagement with the projection of the first positioning pin to release the tool holder from the tool turret and to allow the tool holder to be removed from the tool turret.

11. The positioning device according to claim 10 wherein the actuator has an actuating pin being supported in the tool holder and being displaceable relative to the bending rod, one end of the actuating pin acting on the bending rod, an opposite end of the actuating pin being accessible from outside of the tool holder, the actuating pin being movable to cause the latching end of the bending rod to come out of engagement with the projection of the first positioning pin.

\* \* \* \* \*